United States Patent [19]

Schellekens

[11] Patent Number: 5,037,884

[45] Date of Patent: Aug. 6, 1991

[54] OBJECTS FROM ETHYLENE VINYL ALCOHOL COPOLYMERS HAVING A HIGH STRENGTH AND MODULUS AS WELL AS A PROCESS FOR THE PREPARATION THEREOF

[75] Inventor: Ronald M. A. M. Schellekens, Maastricht, Netherlands

[73] Assignee: Stamicarbon B.V., Geleen, Netherlands

[21] Appl. No.: 121,842

[22] Filed: Nov. 17, 1987

[30] Foreign Application Priority Data

Nov. 17, 1986 [NL] Netherlands .................. 8602912

[51] Int. Cl.$^5$ .................................... C08F 16/06
[52] U.S. Cl. ........................................... 525/60
[58] Field of Search ................................ 525/60

[56] References Cited

U.S. PATENT DOCUMENTS 4,294,935 10/1981 Kodera et al. .................. 525/60

FOREIGN PATENT DOCUMENTS 0146084 6/1985 European Pat. Off. .

OTHER PUBLICATIONS

Sakurada, I., Polyvinyl Alcohol Fibers, Chapter 3, pp. 57-61 (Marcel Dekker, Inc., 1985).
Finch, Ed., Polyvinyl Alcohol, Properties and Applications, pp. 18-19, (John Wiley and Sons, 1973).

Primary Examiner—Joseph L. Schofer
Assistant Examiner—J. M. Reddick
Attorney, Agent, or Firm—Cushman, Darby & Cushman

[57] ABSTRACT

The invention relates to an object and a process for the preparation of an object from an ethylene-vinyl alcohol copolymer with high tensile strength and modulus, by converting:

a) a solution of an ethylene-vinyl alcohol copolymer with a weight-average molecular weight above $6 \times 10^4$ kg/Kmole into a shaped, solvent-containing object in a suitable solvent or mixture of solvents;

b) converting this object into a gel object with a homogeneous gelstructure by rapid cooling to below the gelation temperature;

c) removing the solvent present in this gel object for the most part d) Drawing the gel object during or after solvent removal at a temperature above the glass transition temperature but below the melting temperature of the copolymer.

6 Claims, No Drawings

OBJECTS FROM ETHYLENE VINYL ALCOHOL COPOLYMERS HAVING A HIGH STRENGTH AND MODULUS AS WELL AS A PROCESS FOR THE PREPARATION THEREOF

The invention relates to objects from ethylene-vinyl alcohol copolymers (=EVAL) having a high tensile strength and a high modulus as well as to a process for the preparation of such objects.

For the preparation of EVAL fibres numerous methods have already been proposed, notably in patent literature.

From JP-A-50/35426, for instance, it is known to prepare fibres having a tensile strength of 0.77 GPa and a modulus of 12.7 GPa by melt spinning of EVAL having an ethylene content of 30 mole % and a degree of hydrolysis of 99.7%, followed by drawing. From JP-A-48/28977 it is known to spin EVAL having an ethylene content of 25-42 mole %, dissolved in an aqueous methanol solution and in the presence of boric acid, in an aqueous methanol coagulation bath and subsequently draw it to filaments having a tensile strength of 0.77 GPa and a modulus of 14 GPa. From U.S. Pat. No. 2,467,196, it is known to convert EVAL solutions by spinning in a coagulation bath or in air into filaments that, after drawing, have a tensile strength of 1.0-1.25 GPa.

It further is known to prepare fibres having a very high tensile strength and modulus starting from solutions of polymers with a high molecular weight, see GB-A-2 042 414 and 2 051 667. According to the process described in GB-A-2 042 414, to this end a diluted solution of, for instance, polyethylene is spun, the filament obtained is cooled until a gel filament is formed, and the solvent-containing gel filament is drawn at elevated temperature. According to the process described in GB-A-2 051 667, to this end a solution of high-molecular polyethylene is spun, the solvent optionally is removed largely or partly, and the gel filament is subjected to high drawing, related to the molecular weight, at a specific temperature. In these known processes it has been found that the moduli that can be achieved, increase with the molecular weight of the polyethylene. As a consequence, these known processes can be used to prepare fibres on the basis of polyethylene that have tensile strengths much higher than 1.2 GPa and moduli of more than 20 GPa.

In the above-mentioned GB-A-2 042 414 it is stated that the proposed process can be used, for instance, for the preparation of fibres from other polymers having a high strength and modulus.

From EP-A-105 169 and EP-A-146 084 it is known to prepare fibres having a high tensile strength and modulus by spinning a solution of polyvinyl alcohol, subsequent cooling, and drawing of the resulting filament after solvent removal. The mechnical properties of the fibres, btained are, however, highly sensitive to moisture, while in addition the resistance to degradation is rather low, especially at elevated temperature.

The present invention provides a process for the preparation of objects having a high strength and modulus from EVAL in which the disadvantages referred to do not or hardly occur, as well as new objects having a high strength and modulus on the basis of EVAL.

The invention therefore relates to objects from ethylenevinyl alcohol copolymer with a weight-average molecular weight higher than $6 \times 10^4$ kg/Kmole, having a tensile strength exceeding 1.4 GPa and a modulus exceeding 30 GPa. More in particular the modulus of the objects is higher than 40 GPa and the tensile strength higher than 1.8 GPa, on the basis of EVAL with a weight avarage molecular weight higher than $8 \times 10^4$, by preference higher than $1 \times 10^5$ kg/Kmole.

By preference use is made of EVAL with a degree of hydrolysis above 98%, a low degree of branching and an ethylene content of 2-50, in particular 5-40 mole %.

Though the invention relates in the first place to filaments or fibres having the above-mentioned properties, it also relates to tapes, ribbons, films, tubes, bars or profiles on the basis of EVAL, having the above-mentioned properties.

The present invention further provides objects having the above-mentioned properties that, in a very general sense, have been obtained by spinning of an EVAL solution, and more in particular by thermoreversible gelation from a solution followed by drawing of the gel object obtained.

The invention further relates to a process for the preparation of an object from an ethylene-vinyl alcohol copolymer having a high tensile strength and modulus, which is characterized in that:
a) a solution of an ethylene-vinyl alcohol copolymer with a weight-average molecular weight above $6 \cdot 10^4$ kg/Kmole is converted into a shaped, solvent-containing object in a suitable solvent or solvent mixture at a temperature above the dissolving temperature;
b) this object is converted, by rapid cooling to below the gelation temperature, into a gel object having a homogeneous gel structure;
c) the solvent present in this gel object is for the most part removed;
d) during or after solvent removal the gel object is drawn at a temperature above the glass transition temperature but below the melting point of the ethylene-vinyl alcohol copolymer.

In the process according to the invention an EVAL is used that has a weight-average molecular weight above $6 \times 10^4$, preferable above $8 \times 10^4$, and in particular above $1 \times 10^5$ kg/Kmol. It is preferred to use an EVAL having a very high degree of hydrolysis, by above 98%, a low degree of branching and an ethylene content of 2-50, in particular 5-40 mole %. Such a polymer can be prepared by hydrolysis of ethylene-vinyl acetate copolymers. The polymer may further contain minor amounts of EVAL-compatible polymers or other substances, such as fillers and the like.

As solvent, in principle any agent can be used in which EVAL dissolves properly above the gelation temperature but is almost insoluble below this temperature. It has been found that these solubilities depend strongly on the ethylene content of the EVAL. For EVAL with a relatively low ethylene content, for instance about 5 mole %, glycerol and dimethyl sulphoxide, among other solvents, appear to be suitable, while for EVAL with a relatively high ethylene content, for instance about 30 mole %, dimethyl formamide appears to be a suitable solvent. By preference ethylene glycol is used as solvent, for both EVAL with a high and EVAL with a low ethylene content. In principle water (for EVAL with a low ethylene content) or mixtures of water and lower alkanols, such as methanol, (for EVAL with a higher ethylene content) can also be used as solvent, in which case, however, cooling to considerably having good mechanical properties. Of course it is also possible to use mixtures of solvents.

The solutions to be applied can be prepared in various ways, for instance by suspending solid EVAL in the solvent followed by stirring at elavated temperature, or by converting the suspension by means of a twin screw extruder provided with mixing and conveying facilities.

The concentration of the solution to be applied may vary. It has been found that highly concentrated solutions can be processed in the process according to the invention, for instance up to 75 wt. %. In particular use will be made of solutions with a concentration between 1 and 50 wt. %, and by preference between 10 and 35 wt. %.

The conversion of the solution into a shaped, solvent-containing object can be carried out in various ways in the subject process, for instance spinning via a spinning head with a round or slit die to a filament or tape, respectively, extruding via an extruder, mostly with a profiled head, or casting onto a chill roll.

During the conversion the temperature must be chosen above the dissolving point. This dissolving point of course depends on the solvent chosen, the concentration, the molecular weight of the EVAL, the ethylene content and the pressure applied, and it is for instance about 90° C. for ethylene glycol.

The conversion temperature will generally be chosen far above this dissolving point, for instance about 140°-180° C. when ethylene glycol is used. Of course the temperature chosen is below the decomposition temperature of the EVAL and below the boiling point of the solvent.

An essential component of the process according to the invention is the cooling of the shaped, solvent-containing object to below the gelation temperature, such that a gel object with a homogeneous gel structure is obtained, use being made of rapid cooling, preferably, by means of a liquid cooling (quenching) medium. As a matter of course the gelation temperature depends on, among other things, the solvent and generally is virtually the same as the above-mentioned dissolution temperature. The object is preferably cooled to about ambient temperature.

As cooling agent use can be made of a gaseous medium, such as air. Preferably a liquid cooling medium is used. As liquid cooling medium both a medium compatible with the solvent applied, for instance methanol, and a non-compatible, for instance decalin, can be applied.

It may further be advantageous to subject the object to draw-down prior to cooling. This preliminary drawing operation preferably remains limited to at most a factor 20, and by preference at most 10.

From the gel object obtained upon cooling subsequently the larger part of the solvent still present is removed. This may be effected by, for instance, evaporation, but it is preferred to apply extraction. Suitable extractants have been found to be aliphatic alcohols, in particular methanol, and ketones. By preference as extractant use is made of mixtures of water with lower alkanols, in particular methanol, or with lower ketones. The most suitable extractant, in particular when ethylene glycol, glycerol or dimethyl formamide is used as solvent, appears to be a mixture of acetone and water with a water content of 20-95 vol. %. The extraction may, if desired, be effected at elevated temperature, though the dissolution temperature of the gel must not be exceeded.

During, or preferably after, solvent removal (extraction), the gel objects are drawn in one or more steps, optionally with a temperature gradient. The temperature is generally kept above the glass transition temperature but below the melting point of EVAL. Drawing is preferably effected at just below the melting point of the object to be drawn. It is also possible to apply a slight, cold draw-down of the gel object prior to solvent removal, as a result of which part of the solvent will be sqeezed out. Optionally, also a slight cold draw-down can be applied after solvent removal.

It has been found that high draw ratios can be applied in the subject process. In general a draw ratio of at least 10, and preferably at least 15, is applied. Optionally, the drawn objects can be subjected to heating during a short time.

The objects according to the invention are suitable for almost all technical applications, such as composite applications, replacement of glass fibres, etc.

If desired, in or on the objects minor amounts of customary additives, stabilizers and the like can be incorporated.

The invention will be elucidated in the following examples, without, however, being restricted thereto.

EXAMPLE I

An amount of EVAL powder with a weight-average molecular weight of $1.19 \times 10^5$ kg/Kmole, an ethylene content of 12 mole % and a degree of hydrolysis of 99% was added to ethylene glycol in an amount of 30 g per 100 ml ethylene gycol, following which the suspension was stirred for 2 hours at 160° C. The spinning solution was transferred to a double-walled cylinder, which was thermostatted by means of oil heating at a temperature of 160° C. Using a piston coupled to a variable-speed motor, the solution was forced through a capillary (diameter 0.5 mm) into a quenching bath at a rate of 130 ml/hour. As quenching medium use was mede of methanol; the quenching temperature was 20° C. The distance between capillary and liquid level of the quenching bath was 5 cm. The quenched filaments were wound at a rate of 92 cm/sec, corresponding with a draw-down ($=V$) of 5.0. The filament was subsequently placed in an extraction bath (methanol) at 20° C. The extracted filament was dried to the air at 20° C. and subsequently drawn 21 times at 190° C. The filament obtained had a tensile strength of 2.2 GPa, a modulus of 57 GPa and an elongation at break of 4.7%. The tensile strengths and moduli of the filaments thus obtained were determined using a Zwick 1445 draw bench. The clamp length was 50 mm and the drawing rate 5 mm/min. The modulus was determined from the slope of the first part (between 0 and 0.4%) of the stress-strain curve at 23° C.

Note

The molecular weight was determined on re-acetylated ethylene vinyl alcohol copolymers.

In re-acetylation, 1 gramme of EVAL was dissolved in pyridine (18 ml). After complete dissolution, acetic anhydride was added (9 ml). The solution was allowed to react for three hours at 90° C., following which the solution was precipitated in an ice/water mixture, filtered off, and vacuum-dried at 50° C. Of the ethylene-vinyl acetate copolymer formed (EVAc) the number-average molecular weight ($M_n$) was determined by osmometry and the molecular weight distribution by GPC. The molecular weights thus obtained reflect those of the original EVAL. The molecular weight of the EVAL is about half that of the EVAc.

EXAMPLE II

The process of EXAMPLE I was repeated, however with an EVAL having an Mw of 142,000 kg/Kmole, an ethylene content of 4 mole % and a degree of hydrolysis of 99.5%, which was dissolved at 110° C. in a concentration of 25 g in 100 ml dimethylsulphoxide. The cooling temperature was 0° C., the extractant was an acetone/water mixture and the draw ratio was 22.

The filament obtained had a tensile strength of 1.85 GPa, a modulus of 49 GPa and an elongation at break of 5.1%.

EXAMPLE III-X

The process of EXAMPLE I was repeated, but with other types of EVAL and other process conditions.

The results are summarized in Table A.

COMPARATIVE EXAMPLE

In the way described in EXAMPLE I, an EVAL with an Mw of 24,000 kg/Kmole and an ethylene content of 32 mole % was dissolved in a concentration of 80 g in 100 ml ethylene glycol. The draw-down was 3.3, the drawing temperature 140° C. and the draw ratio 12.

The filament obtained had a tensile strength of 0.44 GPa, a modulus of 6.7 GPa and an elongation at break of 9.3%.

TABLE A

| example No | Mw of EVAL (kg/Kmole) | ethylene content (mol. %) | solution concentr. (g/100 ml) | draw-down | drawing temp. (°C.) | draw ratio | tensile strength (GPa) | modulus (GPa) | elongation at break (%) |
|---|---|---|---|---|---|---|---|---|---|
| III | 142.000 | 4 | 25 | 3,3 | 190 | 22 | 2,19 | 65 | 5,0 |
| IV | 142.000 | 4 | 25 | 5,0 | 190 | 17 | 2,21 | 52 | 5,7 |
| V | 152.000 | 7 | 25 | 3,3 | 190 | 25 | 2,17 | 65 | 5,1 |
| VI | 152.000 | 7 | 25 | 5,0 | 190 | 20 | 2,25 | 59 | 4,7 |
| VII | 119.000 | 12 | 30 | 3,3 | 190 | 20 | 2,02 | 56 | 4,1 |
| VIII | 100.000 | 13 | 36 | 3,3 | 180 | 21 | 2,05 | 51 | 5,5 |
| IX | 100.000 | 13 | 36 | 5,0 | 180 | 22 | 2,12 | 48 | 5,5 |
| X | 100.000 | 13 | 36 | 5,0 | 190 | 23 | 2,25 | 53 | 4,9 |

I claim:
1. Object from an ethylene-vinyl copolymer with a weight-average molecular weight above $6 \times 10^4$ kg/kmole, with a tensile strength of more than 1.4 GPa and a modulus of more than 30 GPa.
2. Object from an ethylene-vinyl copolymer with a weight-average molecular weight above $8 \times 10^4$ kg/kmole, with a tensile strength of more than 1.8 GPa and a modulus of more than 40 GPa.
3. Object from an ethylene-vinyl alcohol copolymer with a weight-average molecular weight of more than $1 \times 10^5$ kg/Kmole.
4. Object according to claim 1, the copolymer having a degree of hydrolysis of more than 98% and an ethylene content of 2-50 mole %.
5. Object according to claim 4, the ethylene content being 4-40 mole %.
6. Filament from an ethylene-vinyl alcohol copolymer according to claim 1.

* * * * *

UNITED STATES PATENT AND TRADEMARK OFFICE
CERTIFICATE OF CORRECTION

PATENT NO. : 5,037,884

DATED : August 6, 1991

INVENTOR(S) : SCHELLEKENS, Ronald

It is certified that error appears in the above—identified patent and that said Letters Patent is hereby corrected as shown below:

Column 1, line 40, change "filemant" to --filament--; and line 58, change "btained" to --obtained--.

Column 2, line 45, after the word "by" insert --preference--.

Column 3, line 5, change "elavated" to --elevated--.

Column 6, line 20:

Claim 1, after the word "ethylene-vinyl" insert --alcohol--.

Column 6, line 24:
Claim 2, after the word "ethylene-vinyl" insert --alcohol--.

UNITED STATES PATENT AND TRADEMARK OFFICE
CERTIFICATE OF CORRECTION

PATENT NO. : 5,037,884

DATED : August 6, 1991

INVENTOR(S) : Ronald M.A.M. Schellekens

It is certified that error appears in the above-identified patent and that said Letters Patent is hereby corrected as shown below:

TABLE A, Column 6, lines 11-18, under the header "Mw of EVAL (kg/Kmole)", change "." to --,--;

Column 6, lines 11-18, under the header "draw-down", change "," to --.--;

Column 6, lines 11-18, under the header "tensile strength (GPa)", change "," to --.--; and Column 6, lines 11-18, under the header "elongation at break (%)", change "," to --.--.

Signed and Sealed this

Sixth Day of July, 1993

Attest:

MICHAEL K. KIRK

*Attesting Officer*     *Acting Commissioner of Patents and Trademarks*